April 21, 1953     I. W. DIXON ET AL     2,635,297
FIBER SEPARATING MACHINE
Filed July 14, 1950     2 SHEETS—SHEET 1
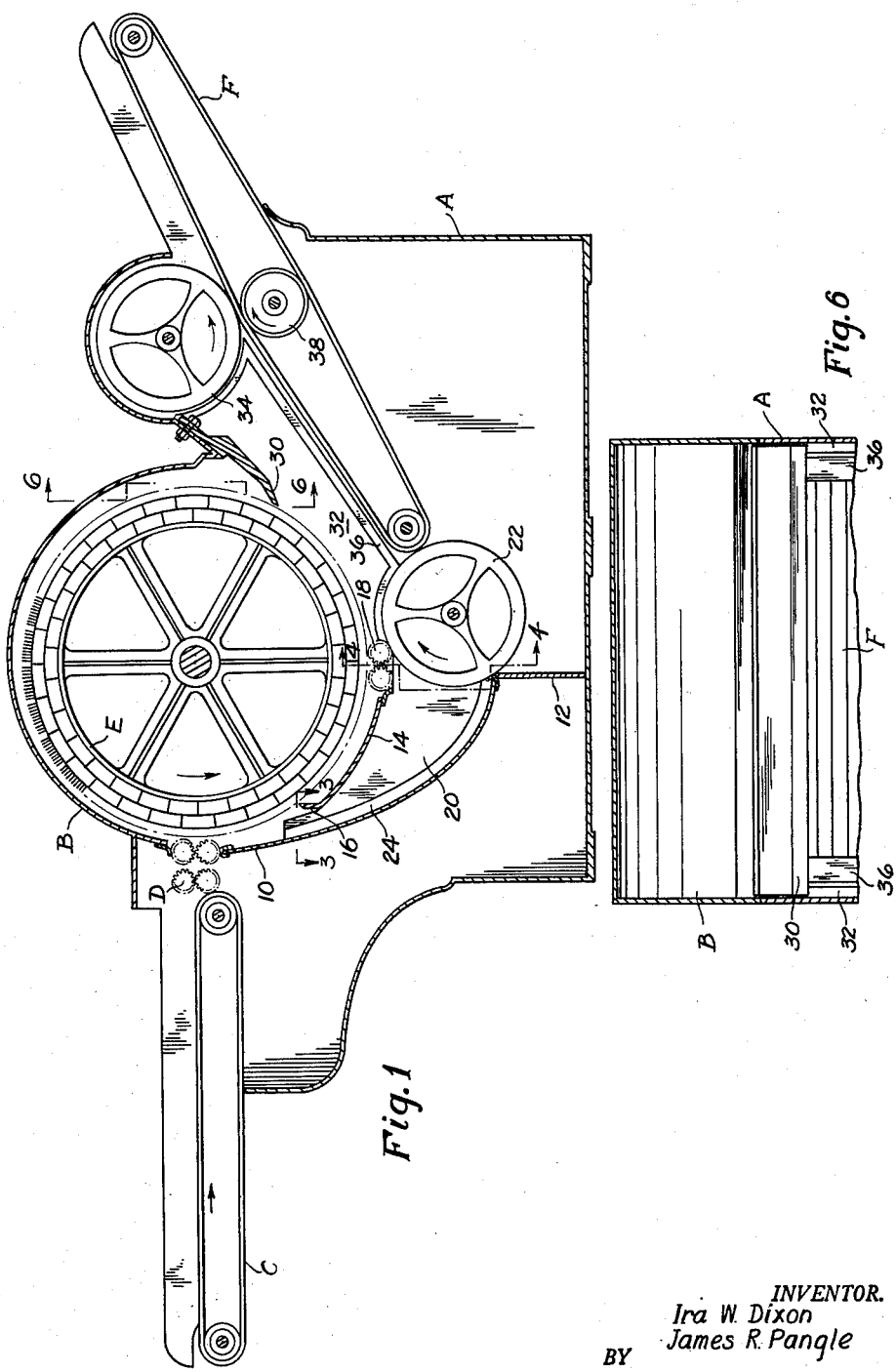
INVENTOR.
Ira W. Dixon
James R. Pangle
BY
Bailey, Stephens, & Huettig
ATTORNEYS

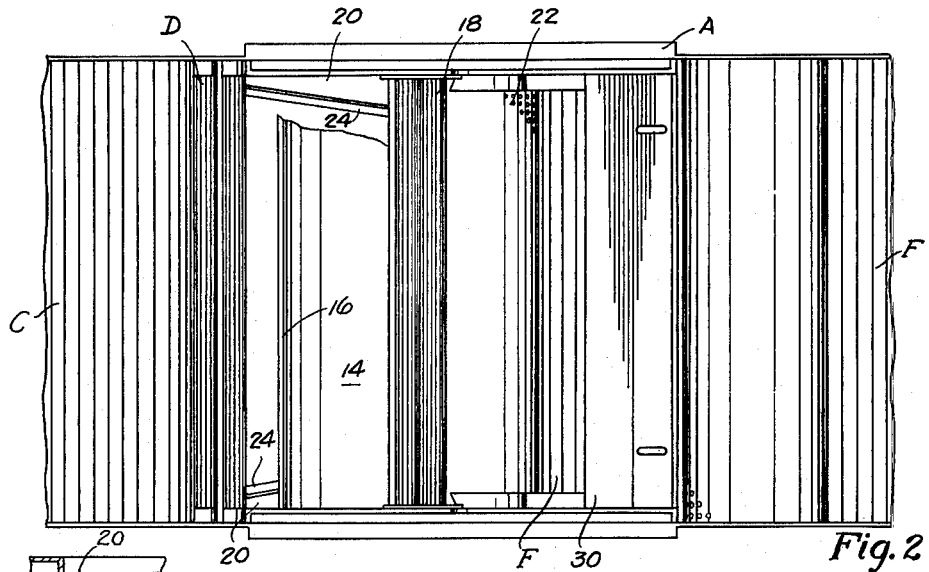
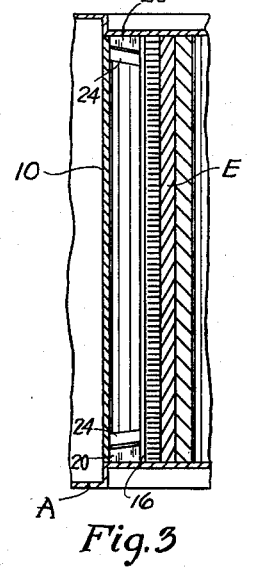
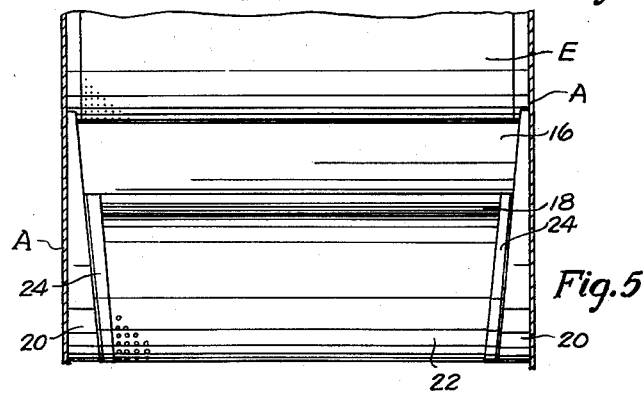
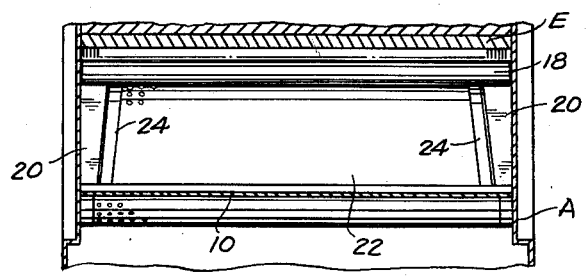
INVENTOR.
Ira W. Dixon
James R. Pangle

Patented Apr. 21, 1953

2,635,297

UNITED STATES PATENT OFFICE 2,635,297

FIBER SEPARATING MACHINE

Ira W. Dixon, Greenwood, S. C., and James R. Pangle, Charlotte, N. C.; said Pangle assignor to said Dixon Application July 14, 1950, Serial No. 173,778

6 Claims. (Cl. 19—89)

This invention relates to a fiber separating or opening machine. In particular, the invention is directed to machines used in the textile industry for separating fibers. Such machines are known as opening machines, picking machines, waste machines, and the like.

In the co-pending application of James R. Pangle, S. N. 65,785, filed December 17, 1948, now abandoned, for "Waste Machine," a machine is shown which was specifically designed for the handling of textile cotton waste material. The instant invention has some structural similarity to the aforesaid waste machine, but differs therefrom in certain essential details as to produce results not obtainable by the aforesaid machine. Accordingly, the instant invention will perform fiber separating operations other than the mere handling of cotton waste materials alone. For example, the instant invention will open and separate cotton, rayon, and wool fibers, whether or not they are in the form of waste, unsized threads, sliver, roving, strips, or heavy motes.

In the preparation of textile fibers for spinning and weaving, the fibrous material is put through various beating, pulling, and tearing processes in order to separate the fibers. This inevitably results in the tearing apart of some of the individual fibers, resulting in inferior shortened staple, and produces some material of such poor quality that it must be discarded. Even in the acceptable material, hard twists are produced in the individual fibers, and these so-called "nips" result in goods of poor quality.

An object of the instant invention is to produce a machine for separating textile fibers with a minimum tearing of the staple, and without producing nips. Further objects of the invention are to produce a machine which is capable of separating or opening a number of different kinds of fibers in a textile mill, which in a single machine will produce as much satisfactorily separated fiber as was heretofore produced by a plurality of machines, and which is not subject to frequent breakdowns as a result of jamming and fires.

Generally, these and other objects are obtained by constructing a machine in which the cutoff blade is spaced a predetermined distance from the feed rolls, and set with respect to the beater teeth so that once the fibers are taken from the beater teeth, they cannot return to the beater teeth unless they are deliberately refed to the beater through other feed rolls. It has been discovered that in previous machines much fiber is carried around with the beater and repeatedly torn and twisted. This is prevented by the construction of the instant invention. In addition, filler blocks are inserted between the feed rolls and the condensing screen in order to channel the separated fibers toward the center of the condensing cylinder and prevent the fibers from collecting between the ends of the cylinder and the inner side walls of the machine. Thus, jamming, tearing of the fibers, and fires caused by friction due to jamming, are eliminated substantially.

These and other objects of the invention are obtained by the machine more fully described with reference to the accompanying drawings, in which:

Figure 1 is a longitudinal cross sectional view through the machine;

Figure 2 is a top plan view of the machine with the cover and beater removed and parts broken away;

Figure 3 is a cross sectional view on the line 3—3, Figure 1;

Figure 4 is a cross sectional view on the line 4—4, Figure 1;

Figure 5 is an end view of the machine with the end cover plate removed; and

Figure 6 is a cross sectional view on the line 6—6, Figure 1.

As seen in Figure 1, the mechanism is housed in a substantially airtight casing including base portion A and cover B. Feed conveyor C leads to feed rolls D and a conventional beater E. Separated fibers leave the machine on discharge conveyor F.

The forward end of the machine, as part of base portion A, is enclosed by a curved skirt plate 10 extending from feed rolls D to below beater E, and a vertical plate 12 going to the bottom of the machine. Mounted between this plate and the beater, and closely adjacent the beater, is a shield plate 14, the upper end of which constitutes a cutoff plate 16 and the lower end of which terminates adjacent a second pair of feed rolls 18.

Mounted on the inner side walls of base portion A, are filler blocks 20, note Figure 5, which from a point above cutoff plate 16 are tapered to an increased width down to a cylindrical condensing screen 22. The joint between filler blocks 20 and plate 10 is made reasonably airtight by leather sealing strips 24. It is noted that all other joints, as between plate 10 and feed rolls E, between plate 10 and screen 22, and between plate 14 and feed rolls 18, are likewise provided with leather sealing strips, as indicated in the drawings.

The position of the upper knife edge of the cutoff blade 16 is most important. For a beater E having a thirty inch diameter, the upper edge of blade 16 is set an arcuate distance from about eight to eleven inches below the bottom of feed rolls D, and is spaced from the beater teeth about one-sixteenth to one-quarter inches, depending upon the type of fibers being separated. For example, the setting is not more than three-sixteenths of an inch for ordinary cotton waste, and wider for long staple cotton, wool and rayon.

Shield 14 prevents fibers knocked by blade 16 from the beater teeth from being again caught by the beater teeth. Consequently, the spacing between feed rolls D and plate 16 is such as to permit the beater teeth functioning as a fan to create an air blast of sufficient velocity to carry separated fibers from rolls D to cylinder 22. As the volume of the channel progressively increases toward cylinder 22, the air velocity rapidly drops to near zero at cylinder 22. Thus, fibers are first separated by blade 16 from the beater teeth before they have a chance to become twisted around the teeth, and carried around by the beater. Once separated, they are prevented by shield 14 from being reengaged by the beater teeth, and are gently deposited on cylinder 22. Foreign material, such as dirt, sticks, and metal objects, being heavy, collects on the bottom end of plate 10 where it can be removed from time to time through side openings in the machine. There is not enough air velocity at cylinder 22 to suspend the foreign material and carry it on to feed rolls 18. Whatever air velocity is left is exhausted through cylinder 22 into the substantially dead air space beneath the cylinder. Filler blocks 20 keep the fibers from packing between the ends of cylinder 22 and the inner surfaces of the side walls of housing A, thus avoiding jamming and fire producing conditions which have existed in prior machines.

In the machine illustrated, the feed rolls 18 and cylinder 22 can be eliminated, in which case shield plate 14 would be continued around the beater and the fibers removed on conveyor F. However, it has been found that the fibers can, without harm, be fed from cylinder 22 into feed rolls 18, and the fibers again separated by the beater teeth. In this case, the second cutoff blade 30 has its knife edge spaced an arcuate distance of from about fifteen to eighteen inches from feed rolls 18, and the setting of the knife edge from the beater teeth is the same as that described for blade 16. As blade 30 extends from adjacent beater E to cylinder 34, the blade constitutes a shield for preventing fibers separated from the beater from being reengaged by the beater teeth.

Side filler blocks 32, Figure 6, extend along the inner surfaces of housing A and above conveyor F to keep fibers from jamming between the side walls and the ends of cylinder 22, and between the side edges of conveyor F and the ends of cylinder 34. Leather sealing strips 36 cover the joints between the filler blocks and these elements.

Cylinder 34 is spaced in the order of an eighth of an inch from conveyor F, this spacing being rather closely maintained by the intermediate roller 38 supporting the center of conveyor F. Cylinder 34 is an ordinary perforated condensing unit, and is open to the atmosphere on the discharge side of conveyor F.

The operation of the machine simply requires the placing of the fibrous material on conveyor C. The material is taken by rolls D and pulled apart by the teeth of beater E. Then the separated fibers are carried by the air current created by beater E down to condenser 22. Any fibers left on the beater teeth are knocked off by blade 16 before they have had time to become twisted on and held by the teeth, and all the fibers are prevented by shield 14 from being reengaged by the teeth. Nips are thus prevented, as well as undue tearing of the staple of the material. Heavy foreign matter collects at the bottom of plate 10 where the air current subsides to almost zero velocity. The fiber is again fed to the beater by rolls 18, and in the space between these rolls and cylinder 34 the fibers are again prevented by blade 30 from being carried around by beater E. The fibers are compacted beneath cylinder 34 and discharged along conveyor F. All joints between stationary and moving parts of the machine are protected by leather seals.

The passing of fibrous material once through this machine produces a separation of fibers equivalent to the passing of materials four times through the prior art single action machines, or two times through the tandem two beater machines, as has been shown by repeated demonstrations. In addition, the separated fibers produced by the instant machine are substantially free from nips, which are inherently produced by a single pass through the prior art machines and increase in severity with subsequent passes through the prior art machines.

Furthermore, prior art machines designed for separating cotton fibers, could separate rayon fibers only with great difficulty and with frequent breakdowns of the machine, and only when the rayon fibers were heavily coated with starch. In comparison, the instant machine handles rayon fibers without any difficulty and without the necessity of using starch. Again, it has been used successfully for the separation of wool fibers, whereas, as is well known, special machines have been made heretofore for the separation of wool.

The means for driving the beater, feed rolls, condensing cylinders and conveyor are well known in the art, and the invention contemplates the use of such conventional driving means.

The means having been described by which the objects of the invention are obtained,

We claim:

1. In a fiber separating machine comprising feed rolls, a beater for separating fibers fed by said rolls, a cutoff blade for removing fibers caught on the teeth of said beater, a condensing cylinder for settling fibers removed from said beater, and a housing including side walls enclosing the rolls, beater, blade and cylinder, said blade being positioned nearer to said rolls than to said cylinder, and a shield extending between said side walls and from said blade to said cylinder and forming with said housing a passageway for keeping fibers separated by said beater and removed by said blade from reengaging the teeth of said beater between said blade and said cylinder.

2. In a fiber separating machine as in claim 1, said cutoff blade being set a distance ranging from about 8 to 11 inches from said feed rolls in a machine having a 30 inch diameter beater.

3. In a fiber separating machine as in claim 2, means for exhausting air currents created by said beater through said cylinder into a substantially dead air space.

4. In a fiber separating machine as in claim 3, filler blocks mounted coextensive with said shield and covering the end portions of said cylinder whereby fibers are prevented from entering the space between the ends of said cylinders and the side walls of said machine.

5. In a fiber separating machine as in claim 4, a second pair of feed rolls mounted to receive fibers from said cylinder and feed said fibers to said beater, a second cutoff blade mounted a distance ranging from 15 to 18 inches from said second feed rolls, a second condensing cylinder, said second cutoff blade being extended to said second condensing cylinder to constitute a shield for preventing fibers from being reengaged by said beater after being separated from said beater by said second cutoff blade, and a conveyor for moving said fibers beneath said second cylinder.

6. In a fiber separating machine as in claim 1, said housing further comprising a cover plate extending from said feed rolls to said cylinder and divergent from said shield to increase the space toward said cylinder between said shield and cover, and side filler members between said shield and cover convergent in the direction of said cylinder to decrease the distance between said members adjacent said cylinder, and said members covering the end portions of said cylinder.

IRA W. DIXON.
JAMES R. PANGLE.

References Cited in the file of this patent

UNITED STATES PATENTS

| Number | Name | Date |
|---|---|---|
| 242,890 | Cox | June 14, 1881 |
| 2,071,438 | Shorter et al. | Feb. 23, 1937 |
| 2,436,338 | Smith et al. | Feb. 17, 1948 |
| 2,484,604 | Barnes et al. | Oct. 11, 1949 |

FOREIGN PATENTS

| Number | Country | Date |
|---|---|---|
| 304,876 | Great Britain | Jan. 31, 1929 |